United States Patent [19]

Kordts et al.

[11] Patent Number: 4,850,698
[45] Date of Patent: Jul. 25, 1989

[54] METHOD OF DETERMINING MEASURING DATA ON AN OPTICAL TRANSMISSION PATH BY MEANS OF OPTICAL SENSOR

[75] Inventors: Jürgen Kordts, Wedel; Gerhard Martens, Henstedt-Ulzburg, both of Fed. Rep. of Germany

[73] Assignee: U.S. Philips Corporation, New York, N.Y.

[21] Appl. No.: 20,066

[22] Filed: Feb. 27, 1987

[30] Foreign Application Priority Data

Feb. 28, 1986 [DE] Fed. Rep. of Germany ....... 3606488

[51] Int. Cl.$^4$ ........................ G01N 21/59; G01D 5/34
[52] U.S. Cl. ................................ 356/434; 250/231 R; 250/231 P
[58] Field of Search ................... 356/434; 250/231 R, 250/231 P

[56] References Cited

PUBLICATIONS

McCormack, "Remote Optical Measurement of Temperature using Luminescent Materials" Electronic Letters, Sep. 3, 1981, vol. 17, #18, pp. 630–631.

Davies et al., "Displacement Sensor using a Compensated Fibre Link" Fiber Optic Sensors, 2nd International Conference, Stuttgart, Sep. 5–7, 1984, pp. 387–390.

*Primary Examiner*—Vincent P. McGraw
*Attorney, Agent, or Firm*—Thomas A. Briody; Jack E. Haken; Anne E. Barschall

[57] ABSTRACT

The invention relates to a method of taking measurements along an optical transmission path by means of an optical sensor. The optical sensor includes an optical converter whose optical attenuation properties can be influenced according to the value to be measured and through which a first beam portion of a high-frequency amplitude-modulated optical transmission beam is passed. A second beam portion of this transmission beam is conveyed via a delay element. The second beam portion is applied together with the first beam portion outputted by the optical converter, via the transmission path as a receive beam to the receiver arrangement. In this way the modulation change produced by the sensor is processed and evaluated as an information about the measure value. Measuring a value at the transmitter end is possible with any optical transmission path of an undefined length, without recalibration of the receiver arrangement, because the optical transmitter beam is additionally subjected to low-frequency modulation. An original modulation factor $m_o$ of the transmission beam is preset as the ratio of the high-frequency ($I_{HF}$) to the low-frequency ($I_{NF}$) modulation amplitude and is fed the receiver arrangement 3. The received sensor-influenced modulation factor of the receive beam is measured by the receive arrangement 3. The received-to-original modulation signal ratio is evaluated as information about the measuring value (M).

22 Claims, 2 Drawing Sheets

METHOD OF DETERMINING MEASURING DATA ON AN OPTICAL TRANSMISSION PATH BY MEANS OF OPTICAL SENSOR

BACKGROUND OF THE INVENTION

1. Field of the Invention

The invention relates to a method of taking measurements along an optical transmission path by means of an optical sensor. The optical sensor includes an optical converter whose optical attenuation properties are influenced according to the value to be measured. A first beam portion of a high-frequency amplitude-modulated optical transmission beam is passed through the optical sensor. A second beam portion of this transmission beam is conveyed via a delay element. The second beam portion is transmitted together with the first beam portion, which is outputted by the optical converter to the receiver arrangement via the transmission path as a receive beam. In this way a modulation change produced by the sensor is processed and evaluated as information about the measured quantity.

2. Prior Art

Such a method is disclosed in "Proceedings of the 2nd International Conference on Fiber Optic Sensors", Stuttgart 1984, pages 378 to 390. In this prior art, one of the beam portions of the transmission beam, which is not affected by the converter of the sensor, is passed through an optical delay line. After a time shift this beam portion is combined again with the converter-influenced beam portion. Together the two beam portions are fed into an optical wave guide used for transmission to a receiver arrangement. The beam portion conveyed through the delay line constitutes a reference beam. The relative phase angles of the modulation portion of the two beam portions are different. The resultant phase angle of the received beam is compared with the original phase angle of the transmission beam. Information about the value to be measured can be derived from the differential angle or the phase shift. Such information is independent of any fluctuations in the attenuations of the transmission paths from and to the transmitter. It is prerequisite that the overall length of the transmission path from the light source to the sensor and from the sensor to the receive arrangement is known, as only when this condition is satisfied can the measuring value can be determined from the differential angle. When the overall length of the optical transmission paths is altered the receive arrangement must be recalibrated.

The invention has for its object to provide a method of the type described in the opening paragraph in which it is possible to measure a value at the transmitter end for any optical transmission paths of undefined lengths without recalibration of the receive arrangement.

This object is accomplished by having the optical transmission beam be additionally subjected to low-frequency modulation. An original modulation factor $m_0$ of the transmission beam is equal to the ratio of the low-frequency ($I_{NF}$) to the high-frequency ($I_{HF}$) modulation amplitude. The original modulation factor $m_0$ is fed as data to the receive arrangement 3. The sensor-influenced received modulation factor, $$m_1 = \frac{r_{NF}}{r_{HF}},$$

of the receive beam is measured by the receive arrangement 3. The received-to-original modulation factor ratio is evaluated as information about the value to be measured.

Theoretical considerations show that the ratio between the modulation factors of the two beam portions depends not only on the attenuation of the transmission path, but also on its length. By means of the dual modulation effected in accordance with the invention, with significantly different frequencies, it is possible to reliably determine from the received optical signals the modulation factor $m_1$ changed by the transmitter, without the risk of the results being degraded by the dark current of a photodetector.

To ensure that for the low-frequency modulation there is substantially no phase difference between the two beam portions, it is advantageous for the modulation frequencies of the high-frequency and low-frequency modulations to differ in ratio by at least $10^3$.

In accordance with an advantageous embodiment of the invention the high-frequency modulation signal is multiplied by the low-frequency modulation signal and the received modulation signals are separated by filters and their peak values are determined.

If the modulation amplitude of the high-frequency modulation is chosen to be twice the modulation amplitude of the low-frequency modulation, it is possible to obtain with simple circuit means an original modulation factor $m_0$ which is always constant.

Particularly simple circuits can create square-wave modulation.

Simple circuit structures may also be used when the high-frequency modulation is only superimposed on the positive range of the low-frequency modulation. It is then not necessary for the period of time of the positive half-wave of the low-frequency square-wave modulation to be equal to the period of time of the negative half-wave. It is, however, advantageous for the superimposed high-frequency modulation to be formed from symmetrical positive and negative half-waves. This is basically ensured for square-wave modulations, independent of instantaneous curves in the characteristics of a LED.

It is particularly simple to form a known and uniform modulation factor when the transmitter transmits groups of optical square-wave pulses having a duty cycle of 1:1, and the transmission time of a group is followed by an interval whose length amounts to a multiple of the period of the square-wave pulse.

Using the method according to the invention a particularly high measuring sensitivity is achieved when the length of the delay line is approximately an odd multiple of half a wavelength of the high-frequency modulation.

BRIEF DESCRIPTION OF THE DRAWINGS

The invention and its advantages will now be described in greater detail by way of example with reference to embodiments shown in the accompanying drawings.

DETAILED DESCRIPTION OF THE PREFERRED EMBODIMENT

Figure 1:
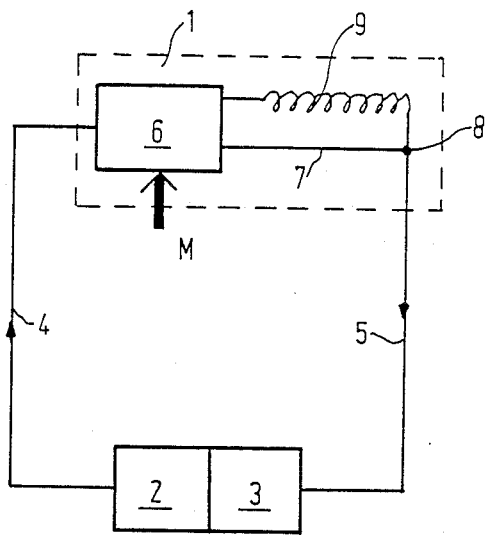
FIG. 1 shows a basic circuit diagram for taking data measurements by means of an optical sensor using an optical delay line.

The prior art arrangement shown in FIG. 1 comprises a sensor 1, a transmitter 2 and a receiver 3, which are connected to the sensor 1 via optical wave guides 4 and 5, respectively. The optical attenuation behaviour of the converter 6 depends on the quantity M to be measured (for example pressure). The transmission beam applied via the LWL 4 is split in the converter into two beam portions, the first of which is substantially affected by the measuring quantity and is fed into the LWL 5 via the line 7 and the opto-coupler 8. The second beam portion (reference beam) which is substantially unaffected by the quantity to be measured, or is affected in a direction opposite to the first beam portion, is applied to the coupler 8 via the delay line 9 and then fed into the LWL 5. The sum signal is received by the receiver 3, processed and evaluated to form an indication representing the measured value M.

The delay line 9 causes the phases and amplitudes of the modulations of two beam portions to differ from each other. Instead of a delay line it is alternatively possible to use any other type of delay elements such as, for example, luminescent crystals (see Electronics Letters 17, 1981, page 630).

Figure 2:
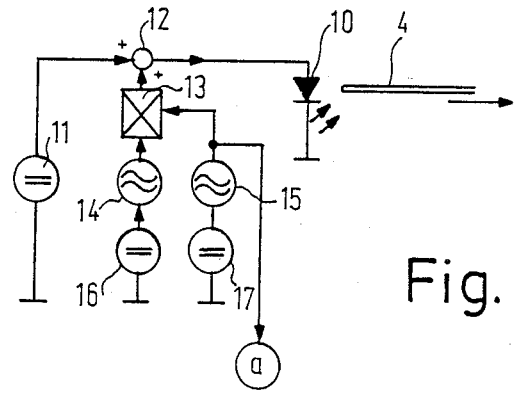
FIG. 2 shows the block circuit diagram of a transmission circuit suitable for the method according to the invention.

The light intensity emitted by the LED 10 is modulated by the transmitter circuit shown in FIG. 2 with a high-frequency signal preferably having a frequency of 10–100 MHz and with a low-frequency signal, preferably 0.5 to 2 kHz. The high and low frequency modulating signals are superimposed at 12 by the superimposition member 13 on the direct current produced by the direct current source 11. The modulation currents are generated by a high-frequency voltage source 14, a low-frequency voltage source 15 and d.c. voltage sources 16 and 17, respectively. The respective voltage sources 14 and 15 can each produce sinusoidal or square-wave signals, depending on the desired signal variation.

Figure 3:
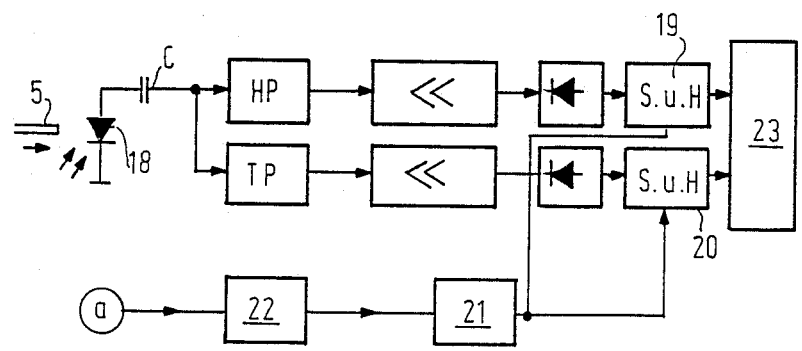
FIG. 3 shows the block circuit diagram of a receive circuit suitable for the method according to the invention.

The opto-electronic converter 18 (photodiode) of the receiver circuit of FIG. 3 converts the modulated light, applied via the LWL 5, into electric signals whose intensity variation is equal to the modulation of the light. A dark current $I_D$ is additionally superimposed. Any constant-light components of the transmit signal and the dark current of the opto-electronic converter 18 are blocked by the capacitor C. The amplified high-frequency modulation signal arrives after peak-value rectification via the high-pass filter HP in the sample-and-hold circuit 19 and the low-frequency modulation signal reaches the sample-and-hold circuit 20 via the low-pass filter TP after amplification and peak-value rectification. The sample-and-hold circuits 19 and 20 are clocked with the low-frequency modulation period via the line a coming from the transmission circuit. Preferably the measuring time is sychronized with the maximum of the low-frequency modulation by a delay element 21. Should the low-frequency modulation not vary in the square-wave mode, the threshold value switch 22 produces square-wave output signals.

Finally, the evaluation circuit 23 divides the high and low frequency modulation signals, so that information proportional to the value to be measured M can be obtained from a comparison of the transmitted and received modulation factors.

Using the circuits shown in the FIGS. 2 and 3, different signal shapes subjected, in accordance with the invention, to dual modulation can be transmitted and evaluated.

When the generators 14 and 15 (FIG. 2) have identical structures, it is, for example, possible to produce continuously sinusoidal signal shapes by means of modulation. Then a variation of the transmit signal, for example, as shown in FIG. 6 is obtained, when the transmission member 13 of FIG. 2 is a multiplier.

Figure 4:
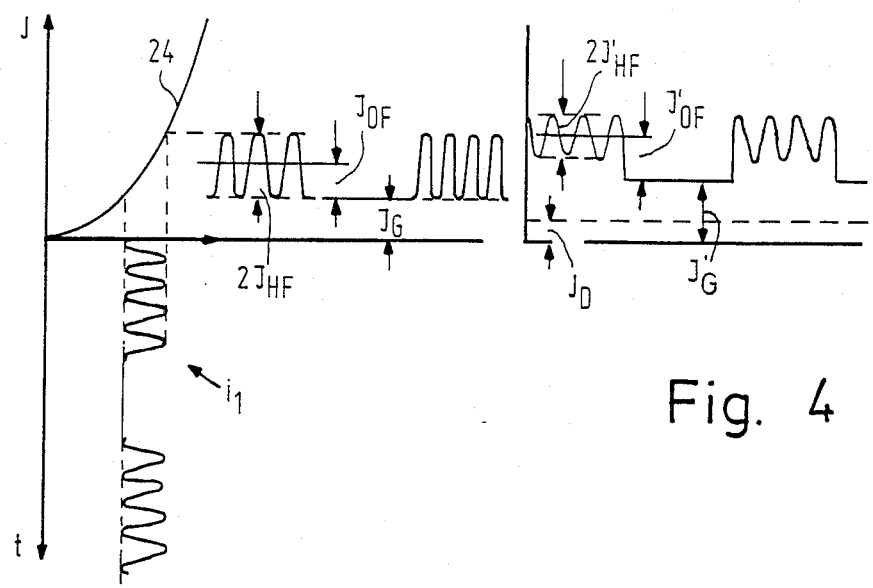
FIG. 4 shows the signal variations for a first implementation of the invention.
Figure 5:
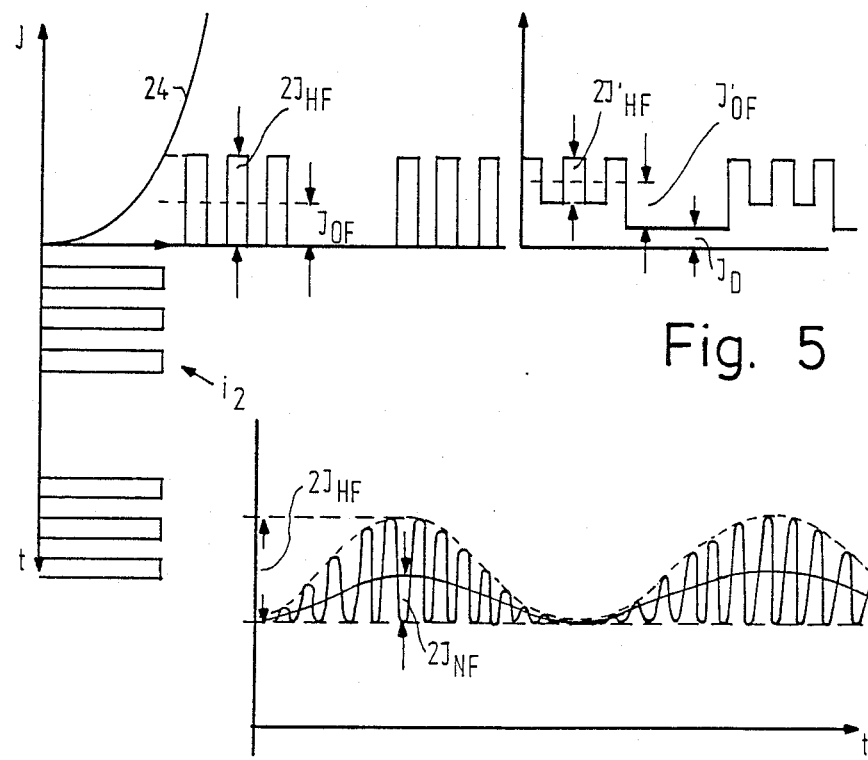
FIG. 5 shows signal variations for a second implementation of the invention.

Circuits producing square-wave, low-frequency modulations corresponding to the signal variation shown in the FIGS. 4 and 5 are particularly simple to realise.

Transmission periods, during which high-frequency pulses are transmitted, are followed by intervals, during which no high-frequency pulses are transmitted. Transmission periods and intervals may have different lengths. It is, however, important for the high-frequency modulation frequency HF to be much higher than the low-frequency modulation frequency NF or the lower clock frequency of the consecutive transmission periods and intervals, respectively.

Figure 6:
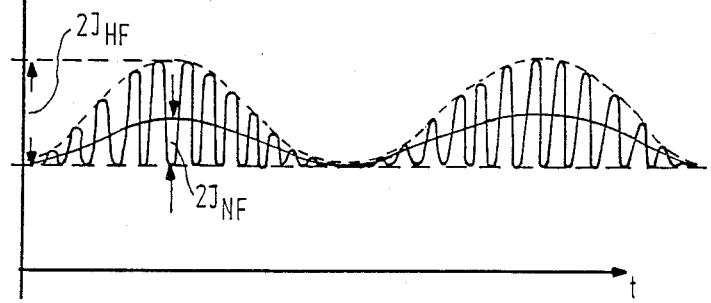
FIG. 6 shows a variation of the transmit signals for a third implementation of the invention.

FIGS. 4, 5 and 6 show signal shapes for which, at the transmitter end, the amplitudes of the high-frequency modulations are twice as high as the amplitudes of the low-frequency modulations. The originally transmitted modulation factor then is $m_0=0.5$. This value is preset and unchangeable because of the structure of the transmission circuit, so that at the transmitter end the value $m_0=0.5$ can be preset as a constant quantity. The transmission circuit is then always of such a structure that, with respect to time, a high-frequency intensity modulated fluctuating light of the amplitude $I_{HF}$, with an offset portion which is always $I_{OF}=I_{HF}$, is superimposed on, with respect to time, an unchangeable basic level or constant light $I_G$, which can alternatively assume the value "zero", it then being a prerequisite that during given time intervals (pause periods) the amplitude $I_{HF}$ must assume the value "zero". The offset portion $I_{OF}$ is transmitted as a low-frequency modulation signal $I_{OF}=2\ I_{NF}$. This can be affected either with a sinusoidal variation as shown in FIG. 6 or with a square-wave variation as shown in the left-hand side of the FIGS. 4 or 5. The transmission of the offset portion $I_{OF}$ as a low-frequency signal has the advantage that its amplitude can be separated from constant light portions. More specifically, dark currents $I_D$ of a photodiode of the receiver cannot negatively affect the value of the offset portion.

As on the other hand, because the frequency of the low-frequency modulation is very low, the phases of the offset portions $I_F$ on the two paths 7 and 9 (FIG. 1) of the beam portions are substantially not shifted relative to each other. In this respect there is hardly any difference compared to constant-light portions.

The left-hand sides of the FIGS. 4 and 5 always show optical pulse variations at the transmitter end, while the right-hand sides show the associated electric output signals produced at the receiver ends by the photodiode 18.

In accordance with FIG. 4, the LED 10, whose characteristic 24 has a curved variation, is operated with a control current $i_1$ which has a time-independent constant portion, which produces a constant light $I_G$. Because of this constant offset portion the LED is operated in a substantially linear range of the characteristic 24, so that the modulation half-waves are identical. Blocks of high-frequency consecutive pulses are superimposed on the constant portion, these pulses producing sinusoidal intensity fluctuations of the transmitted light with the amplitude $I_{HF}$, which are superimposed on the constant-light portion $I_G$ with an offset intensity $I_{OF}$.

The electric output signal of the photodiode 18 then contains a constant-light portion $I'_G$, which additionally contains the dark current $I_D$ of the photodiode 18. Splitting these current portions is however not required, as only the offset portion $I'_{OF}$ is evaluated. $I'_{OF}$ is proportional to the transmitted offset portion $I_{OF}$, and is not influenced by the dark current $I_D$. The value $I'_{OF}$ is influenced by the measured value M, but not by the delay line 9. The receive signal $I'_{HF}$ is additionally decreased with respect to the offset portion, due to the effect of the delay line 9. Consequently, the received modulation factor $m_1$ is changed from the transmitted modulation factor. The extent of this change is unambiguous information about the measuring value of M to be obtained.

At the transmitter end, the high-frequency modulation could also be effected in the manner described with reference to FIG. 4 with square-wave variations, using a corresponding generator 14 of a simple structure with flip-flop circuits. An evaluation can also be effected at the receiver end using the circuit of FIG. 3, when the high-pass filter HP is constituted by a band-pass filter, so that only the fundamental frequency of the square-wave high-frequency transmission modulation is evaluated.

A particularly simple and preferred embodiment of the invention can be obtained with the signal variations shown in FIG. 5. In that Figure the control current $i_2$ is pulsed in a high-frequency, square-wave mode in blocks, separated by intervals, with a duty cycle "one". Square-wave optical modulation signals having a duty cycle "one" are always obtained, independently of the curvature of the LED characteristic 24, so that the condition $I_{HF}=I_{OF}$ is accurately satisfied.

The electric output signals of the photodiode 18, shown in the right-hand side of FIG. 5, also have the illustrated square-wave variation, it being assumed that the length L of the delay line 9 is an odd multiple of half the modulation wavelength ($\Delta L=(2k+1)\lambda/2$; k=0,1,2 ...), so that it is not necessary to replace the high-pass filter HP of FIG. 3 by a band-pass filter.

Depending on the modulation frequency $\omega_{HF}$ and the associated wavelength $\lambda$ the following typical values of the length L of the delay line are then obtained:

L=1 m for $\lambda$=2 m and $\omega$HF=100 MHz

L=10 m for $\lambda$=20 m and $\omega$HF=10 MHz

The ratio, required for transmitting the measuring value M, between the transmissions $T_1$ and $T_2$ of the path portions via the delay line 9 or via the direct path 7, respectively, is obtained from the equation:

$$\frac{m_1}{m_o} = \frac{T_1 - T_2}{T_1 + T_2},$$

provided $\Delta L=(2k+1)\lambda/2$

In general it holds that:

$$\frac{m_1}{m_o} = \frac{1}{T_1+T_2} \cdot \sqrt{T_1^2 + T_2^2 + 2T_1 T_2 \cos\Delta\phi}$$

where $\Delta\phi=2\pi,\Delta L/\lambda$.

The ratio between the intensity at the end of a transmission path and the original intensity present at the beginning of the transmission path is, as is customary, designated as transmission T.

When $\Delta L=(2k+1)\lambda/2$ or when this condition is at at least satisfied to a very large extent, the highest measuring sensitivity is obtained.

We claim:

1. A method of determining measuring data on an optical transmission path by means of an optical sensor which includes an optical converter whose optical attenuation properties can be influenced in dependence on the measuring value, said method comprising: passing a first beam portion of a high-frequency amplitude-modulated optical transmission beam through said optical sensor, conveying a second beam portion of the transmission beam via a delay element, applying the second beam portion, together with the first beam portion outputted by the optical converter, via the transmission path as a receive beam to a receiver arrangement, whereby a modulation change produced by the sensor is processed and evaluated to provide information about the measured quantity, wherein the improvement comprises, subjecting the optical transmission beam to low-frequency modulation, presetting an original modulation factor $m_0$ of the transmission beam as the ratio of the low-frequency ($I_{NF}$) to the high-frequency ($I_{HF}$) modulation amplitude feeding said original modulation factor $m_0$ to the receiver arrangement, measuring the sensor influenced received modulation factor $$m_1 = \frac{I'_{NF}}{I'_{HF}}$$

of the receive beam by the receiver arrangement and evaluating the received-to-original modulation signal ratio to provide information about the measured value (M).

2. A method as claimed in claim 1, characterized in that the modulation frequencies of the high-frequency ($\omega_{HF}$) and the low-frequency ($\omega_{NF}$) modulation differ from each other by a ratio of at least $10^3$.

3. A method as claimed in claim 1, characterized in that the high-frequency modulation signal is multiplied by the low-frequency modulation signal and that the peak values of the modulation signals separated by filters is determined.

4. A method as claimed in claim 1, characterized in that the modulation amplitude ($I_{HF}$) of the high-frequency modulation is twice the amplitude ($I_{NF}$) of the low-frequency modulation.

5. A method as claimed in claim 1, characterized in that the low-frequency modulation is effected in a square-wave mode.

6. A method as claimed in claim 1, characterized in that the high-frequency modulation is only superimposed on the positive range of the low-frequency modulation.

7. A method as claimed in claim 5, characterized in that the duration of the positive half-waves of the low-frequency square-wave modulation differs from the duration of the negative half-waves.

8. A method as claimed in claim 5, characterized in that the superimposed high-frequency modulation is formed from symmetrical negative and positive half-waves.

9. A method as claimed in claim 5, characterized in that the transmitter transmits groups of optical square-wave pulses having a duty cycle "one" and that at the transmit end a group of square-wave pulses are always followed by an interval whose length is a multiple of the duration of the square-wave pulses (FIG. 5).

10. A method as claimed in claim 1, characterized in that the length of the delay line is approximately an odd multiple of half the high-frequency modulation wavelength.

11. Apparatus for measuring data along an optical transmission path comprising:
  (a) means for generating an optical transmission beam, which is both high-frequency and low-frequency amplitude modulated, and for feeding an original modulation factor $m_0$ of the transmission beam to a receiver arrangement, $m_0$ being the ratio of a low-frequency modulation amplitude ($I_{NF}$) of the transmission beam to a high-frequency modulation amplitude ($I_{HF}$) of the transmission beam;
  (b) an optical sensor including an optical converter, positioned along the optical transmission path so that a first portion of the transmission beam is passed through said optical converter, said optical converter having optical attenuation properties responsive to the data to be measured;
  (c) a delay element positioned to receive a second portion of the transmission beam;
  (d) means, coupled to receive the first and second beam portions from the optical sensor and the delay element, respectively, for transmitting the first and second beam portions to a receiver arrangement;
  whereby information about the data to be measured is calculated at such a receiver arrangement by comparing $m_0$ to a sensor-influenced received modulation factor $$m_1 = \frac{I'_{NF}}{I'_{HF}}$$

and whereby the data is measured independently of length of the transmission path.

12. Apparatus of claim 11 further comprising the receiver arrangement which includes:
  (i) means for detecting the received modulation factor $m_1$;
  (ii) means for evaluating the received to original modulation signal ratio $m_1/m_0$.

13. The apparatus of claim 12 wherein:
  (a) said means for generating the transmission beam comprises means for multiplying a high frequency modulation signal by a low frequency modulation signal; and
  (b) the receiver arrangement comprises means including filters for separating the peak values of modulation signals.

14. The apparatus of claim 11 wherein modulation frequencies of the high frequency modulation ($W_{HF}$) and of the low frequency modulation ($\omega_{HN}$) differ from each other by a ratio of at least $10^3$.

15. The apparatus of claim 11 wherein the modulation amplitude ($I_{HF}$) of the high frequency modulation is twice the amplitude ($I_{NF}$) of the low frequency modulation.

16. The apparatus of claim 11 wherein the low frequency modulation comprises a square wave.

17. The apparatus of claim 16 wherein the high frequency modulation is only superimposed on the positive range of the low frequency modulation.

18. The apparatus of claim 16 wherein positive half waves of the low frequency square wave modulation differ in duration from negative half waves of the low frequency square wave modulation.

19. The apparatus of claim 16 wherein the superimposed high frequency modulation is formed from symmetrical negative and positive half waves.

20. The apparatus of claim 16 wherein the transmission beam comprises groups of optical square wave pulses having a duty cycle "1", each group of square wave pulses being followed by an interval whose length is a multiple of the duration of the square wave pulses.

21. Apparatus of claim 11 wherein the delay element comprises a delay line which has a length of approximately an odd multiple of half the high frequency modulation wavelength.

22. A method of measuring data on an optical transmission path comprising:
  (a) passing a first beam portion of a high frequency amplitude modulated optical transmission beam through an optical sensor which includes an optical converter whose optical attenuation properties vary according to the value to be measured;
  (b) passing a second beam portion of the transmission beam via a delay element;
  (c) receiving a combined receive beam which includes the first beam portion as output from the optical converter and the second beam portion as output from the delay element;
  (d) processing and evaluating information about the value to be measured based on a modulation change produced by the optical sensor;
  wherein the improvement comprises:
  (e) subjecting the optical transmission beam to a low frequency modulation prior to input to the optical sensor;
  (f) generating an original modulation factor $$m_0 = \frac{I_{NF}}{I_{HF}},$$

which is the ratio of a low-frequency modulation amplitude to a high frequency modulation amplitude;
  (g) measuring a sensor influenced received modulation factor $$m_1 = \frac{I'_{NF}}{I'_{HF}};$$

(h) evaluating the received-to-original modulation signal ratio $m_1/m_0$ to provide information about the data to be measured.

* * * * *